July 6, 1926. Re. 16,373

H. P. J. EARNSHAW

AUTOMOBILE LIGHTING SYSTEM

Original Filed Dec. 11, 1920

INVENTOR.
Henry P. J. Earnshaw,
BY
J. H. McCurdy,
his ATTORNEY.

Reissued July 6, 1926.

Re. 16,373

UNITED STATES PATENT OFFICE.

HENRY P. J. EARNSHAW, OF HYDE PARK, MASSACHUSETTS, ASSIGNOR, BY MESNE ASSIGNMENTS, TO FENDALITE CORPORATION, OF BOSTON, MASSACHUSETTS, A CORPORATION OF MASSACHUSETTS.

AUTOMOBILE LIGHTING SYSTEM.

Original No. 1,508,385, dated September 16, 1924, Serial No. 430,024, filed December 11, 1920. Application for reissue filed March 4, 1926. Serial No. 92,374.

In driving automobiles at night one difficulty which an operator experiences is that of seeing clearly the right hand edge of the roadway when he is turning out to meet an oncoming automobile and this is specially true if the oncoming automobile has bright or dazzling headlights, because the lights of said oncoming automobile are apt to blind the operator thus making it almost impossible for him to see the limits of the roadway. As a result of this, accidents frequently happen due to the fact that an operator will turn his automobile too far out of the roadway and may run into the ditch or run into some obstruction, such as a tree or telephone pole. Furthermore when meeting an automobile with headlights of high power, the operator can not see clearly any pedestrians in the roadway ahead of him and this is also a source of danger.

It is the object of my invention to provide a novel means for illuminating the roadway ahead of an automobile by which all these dangers will be avoided. By means of my invention the right hand side of the roadway is highly illuminated so as to show up clearly the right hand edge of the road and any persons, trees, telephone poles, or other obstacles on the right hand side and this is done in such a way as not to throw any glaring or confusing rays in the path of an oncoming automobile. With my invention an operator can always see how far it is safe for him to turn out in meeting another automobile, and at the same time he is given a clear view of any obstacles in his path. Furthermore this result is obtained in such a way that glaring or bright headlights from oncoming automobiles do not interfere with the vision of the operator as is the case with the ordinary headlights now in use.

I accomplish these objects by mounting on the right rear fender of the automobile a lamp which is so arranged that it will throw its beam of light onto the roadway a short distance in advance of the automobile, and so arrange the lamp that the area directly ahead of the automobile is in the shadow of the automobile which is caused by the lamp. The lamp which I will preferably use is one similar to a so-called spot light, that is, one which will throw a strong beam of light that has relatively little divergence and will also throw out what may be termed, a "secondary light" that has much greater divergence but is of a soft character.

The lamp is so positioned that the strong beam of light will strike the roadway a short distance in advance of the automobile and just outside of the line of travel of the wheels. A light thus placed illuminates perfectly the right hand side of the roadway and up to the line of travel of the right hand wheels of the automobile but does not illuminate the area directly ahead of the automobile, the latter being illuminated by the ordinary head lights. Furthermore a light thus placed is not visible to an oncoming automobile because it is hidden by the automobile body. Such a light throws a strong light where it is most needed, that is, on the right hand side of the road so that the operator always has a clear view of the right hand edge of the road. This makes it easy to drive at night because the operator can merely watch the right hand edge of the road and follow close to it without feeling any sense of danger that he may run into pedestrians, trees or any obstruction.

In order to give an understanding of my invention I have illustrated in the drawings a selected embodiment thereof which will now be described after which the novel features will be pointed out in the appended claims.

Figure 1:
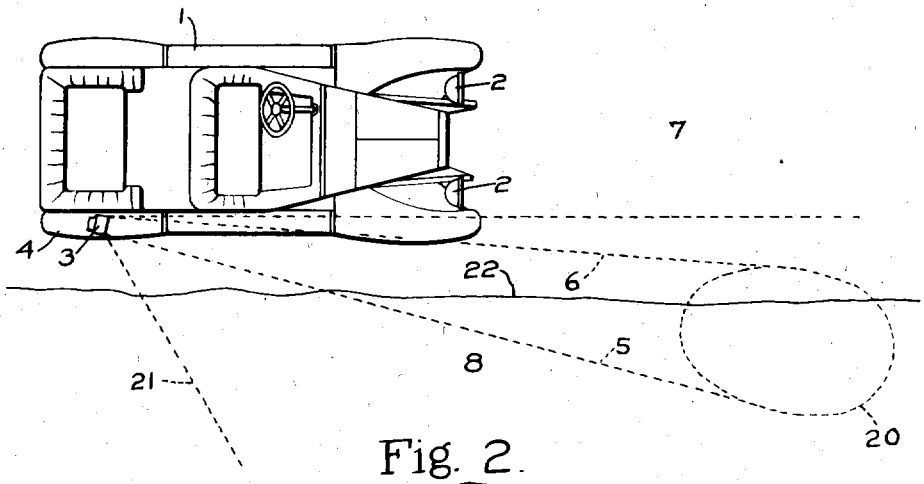
Fig. 1 is a plan view of an automobile having my improvements applied thereto.
Figure 2:
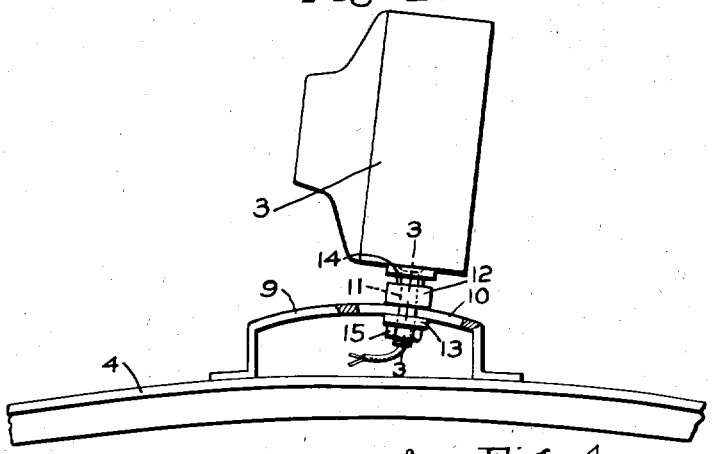
Fig. 2 is a side view of the rear right fender having the lamp attached.
Figure 4:
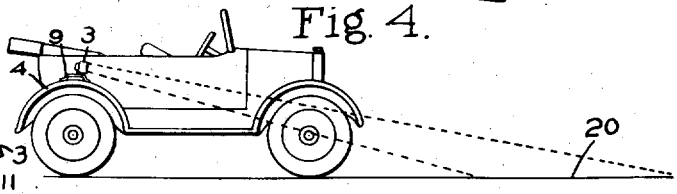
Fig. 4 is a side view of an automobile having my improvements.
Figure 3:
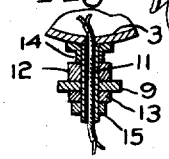
Fig. 3 is a section on the line 3—3, Fig. 2.

1 indicates an automobile having the usual headlights 2 which may be of any suitable or usual construction.

3 indicates a lamp preferably somewhat on the order of the so-called "spotlight" and which is constructed to throw a brilliant beam of light forwardly. This lamp 3 will preferably be constructed so that the beam of light thus projected will have relatively small divergence so that the area illuminated by the beam will be a limited one. This lamp 3 is secured to the rear right fender 4 of the automobile and is so positioned that its beam of light will be directed downwardly past the right front fender and on to the roadway a short distance in front of the automobile. A lamp of the "spotlight" type not only sends out a beam of light but also sends out a so called "secondary" light which illuminates a much greater area than the beam or shaft of light but to a much smaller degree.

In the drawings the beam or shaft of light delivered from the lamp 3 is indicated between the lines 5 and 6 and this will produce on the roadway a highly illuminated spot indicated by the oval 20. The secondary light which has much greater divergence than the beam of light will light up an area extending to approximately the line 21. By placing the lamp 3 on the right rear fender close to the automobile body and giving it the position above described a highly illuminated area 20 is produced a short distance in front of the automobile and just outside the line of travel of the right wheels and the automobile body and the front fender will cut off the light from the area 7 directly in front of the automobile so that this area is not at all affected by the lamp 3. The usual headlights 2 serve to sufficiently illuminate the said area 7. The so-called "secondary light" will illuminate the area 8 between the line 21 and the line 6 which indicates the edge of the shadow cast by the automobile body. The entire area between the line 6 and 21 is therefore illuminated to a certain extent and in addition the portion of this area indicated by the oval 20 is highly illuminated by the beam of light. With this arrangement the division line 6 between the light area 8 and the unlighted area 7 will be approximately in line with the right hand side of the automobile and the bright rays from the lamp 3 will be concealed from any object which is directly ahead of the automobile. This area 7 ahead of the automobile is lighted by means of the usual head-lights 2 which can be made to fully comply with all legal requirements.

In operating an automobile having this method of lighting the roadway the operator finds it extremely easy to follow the roadway even on a foggy night because the right hand edge of the roadway is always highly illuminated and he can safely drive at ordinary speed by simply following the line at the right hand edge of the roadway. Moreover the position of the lamp 3 is such that it is concealed from the view of anything directly in front of the automobile and therefore the bright rays from the light 3 do not interfere at all with the operation of an oncoming automobile.

The lamp 3 may be attached to the rear fender 4 in any suitable way without departing from the invention. I have herein shown the fender as provided with an arch-shaped supporting bracket 9 having a slot 10 therein. The lamp 3 is provided with a hollow stem 11 through which the wires are laid to the lamp terminals and which is inserted through the slot 10. 12 and 13 indicate two clamping blocks through which the stem 11 passes and which are situated on either side of the slotted portion of the bracket 9. The collar or block 12 rests against a shoulder 14 formed on the stem 11 and the two collars or blocks are clamped against the bracket by means of a clamping nut 15 which is screw threaded to the stem 11. These blocks 12 and 13 have rounded surfaces to fit the curvature of the bracket 9. By means of this construction the lamp can be turned about a vertical axis so as to direct the light rays in the proper direction horizontally and by adjusting the lamp longitudinally of the bracket the elevation of the beam of light is controlled. As stated above the lamp is preferably placed so that the beam of light will be thrown slightly downwardly.

I claim:

1. The combination with an automobile having the usual front and rear fenders, of a projecting lamp mounted on the right rear fender and situated in the rear of the driver, said lamp operating to throw a beam of light from behind the driver and across the right front fender, said beam of light being entirely on the right of the driver, and in a vertical plane substantially parallel to the direction of movement of the automobile thereby to produce a brightly illuminated area in front of and directly outside the line of travel of the automobile, the shadow of the right front fender forming the left side of said brightly illuminated area, said lamp being so situated with reference to the automobile body that the road area directly in front of the automobile will be in the shadow thereof whereby said lamp is not visible to anyone directly in front of the automobile.

2. The combination with an automobile having the usual front fenders, of a projecting lamp mounted on the right-hand side of the automobile below the top of the body and situated in the rear of the driver, said lamp being operative to throw a beam of light from behind the driver and across the right front fender, said beam of light being entirely on the right of the driver and directed forward and downward whereby it will produce a brightly illuminated area in front of and directly outside the line of travel of the automobile, the shadow of the right front fender forming the left side of said brightly illuminated area, and said lamp being so situated with reference to the automobile body that the road area directly in front of the automobile will be in the shadow thereof, whereby said lamp is not visible to any one directly in front of the automobile.

In testimony whereof I have hereunto signed this specification.

HENRY P. J. EARNSHAW.